United States Patent
Balakrishnan et al.

(10) Patent No.: US 10,389,887 B2
(45) Date of Patent: *Aug. 20, 2019

(54) APPLICATION SPECIFIC M2M BILLING RECONCILIATION

(71) Applicant: Aeris Communications, Inc., San Jose, CA (US)

(72) Inventors: Subramanian Balakrishnan, San Jose, CA (US); Alpa Shah, San Jose, CA (US)

(73) Assignee: Aeris Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/722,462

(22) Filed: Oct. 2, 2017

(65) Prior Publication Data
US 2018/0027128 A1    Jan. 25, 2018

Related U.S. Application Data

(63) Continuation-in-part of application No. 13/945,645, filed on Jul. 18, 2013, now Pat. No. 9,787,853.
(Continued)

(51) Int. Cl.
*H04M 15/12* (2006.01)
*H04M 15/00* (2006.01)
(Continued)

(52) U.S. Cl.
CPC ........... *H04M 15/12* (2013.01); *H04M 15/24* (2013.01); *H04M 15/41* (2013.01); *H04M 15/58* (2013.01);
(Continued)

(58) Field of Classification Search
CPC ...... H04M 15/12; H04M 15/58; H04M 15/41; H04M 15/73; H04W 4/005; H04W 4/26
(Continued)

(56) References Cited

U.S. PATENT DOCUMENTS 6,266,401 B1   7/2001   Marchbanks
7,945,240 B1   5/2011   Klock et al.
(Continued)

FOREIGN PATENT DOCUMENTS

WO    WO 2001037528    5/2001

OTHER PUBLICATIONS

The International Search Report and the Written Opinion of the International Searching Authority for International Application No. PCT/US2014/029528, dated Nov. 21, 2014.

*Primary Examiner* — Faruk Hamza
*Assistant Examiner* — Jean F Voltaire
(74) *Attorney, Agent, or Firm* — Brundidge & Stanger, P.C.

(57) ABSTRACT

The present invention is directed toward networks and more particularly to a method and system for providing information related to reconciliation billing in such networks. In one or more embodiments, the computer implemented method for identifying discrepancies in billable events includes receiving application usage information regarding the one or more billable activities for one or more devices from an application provider core by a billing and analytic system; receiving cloud service usage information regarding the one or more billable activities for the one or more devices from a cloud operator providing cloud services by a billing and analytic system; comparing the received application usage information and the received cloud service usage information for one or more discrepancies in relation to one or more billable activities by a reconciliation engine; and reporting one or more identified discrepancies in accordance with the one or more billable activities.

22 Claims, 10 Drawing Sheets

Related U.S. Application Data

(60) Provisional application No. 61/784,566, filed on Mar. 14, 2013.

(51) Int. Cl.
*H04W 4/24* (2018.01)
*H04W 4/70* (2018.01)
*H04M 15/24* (2006.01)
*H04W 24/02* (2009.01)

(52) U.S. Cl.
CPC ......... *H04M 15/725* (2013.01); *H04M 15/73* (2013.01); *H04W 4/24* (2013.01); *H04W 4/70* (2018.02); *H04W 24/02* (2013.01)

(58) Field of Classification Search
USPC ........................................................ 455/406
See application file for complete search history.

(56) References Cited

U.S. PATENT DOCUMENTS

| | | |
|---|---|---|
| 2002/0156749 A1 | 10/2002 | Sardy |
| 2002/0160748 A1* | 10/2002 | Rahman ............. H04M 15/745 455/406 |
| 2005/0053211 A1 | 3/2005 | Bevente et al. |
| 2006/0085301 A1 | 4/2006 | Leahy |
| 2006/0265302 A1 | 11/2006 | Schmalenberger et al. |
| 2008/0059346 A1 | 3/2008 | Schweitzer et al. |
| 2008/0204792 A1 | 8/2008 | Frost |
| 2009/0098854 A1* | 4/2009 | Park ....................... G06Q 20/14 455/407 |
| 2010/0274588 A1 | 10/2010 | Choubey |
| 2011/0016321 A1* | 1/2011 | Sundaram ............. H04L 63/061 713/171 |
| 2011/0087550 A1 | 4/2011 | Fordyce, III et al. |
| 2011/0268047 A1 | 11/2011 | Nath et al. |
| 2011/0307932 A1 | 12/2011 | Fan |
| 2012/0046991 A1 | 2/2012 | Bai |
| 2012/0143733 A1 | 6/2012 | Kappauf |
| 2012/0231828 A1* | 9/2012 | Wang ..................... H04W 4/70 455/509 |
| 2012/0329424 A1 | 12/2012 | Gudlavenkatasiva et al. |
| 2013/0003609 A1 | 1/2013 | Ballot et al. |
| 2013/0132854 A1 | 5/2013 | Raleigh et al. |
| 2015/0280765 A1* | 10/2015 | Lowery .................. H04W 8/22 455/558 |
| 2015/0326736 A1* | 11/2015 | Lehane ................. H04W 24/02 455/408 |

* cited by examiner

1

APPLICATION SPECIFIC M2M BILLING RECONCILIATION

CROSS-REFERENCE TO RELATED APPLICATIONS

This application is a continuation-in-part application of U.S. application Ser. No. 13/945,645, filed on Jul. 18, 2013, entitled "M2M BILLING RECONCILIATION" which claims priority to U.S. provisional application Ser. No. 61/784,566, filed on Mar. 14, 2013, and is related to U.S. application Ser. No. 13/945,571, filed Jul. 18, 2013, entitled "CONTEXT ORIENTED BILLING", and U.S. application Ser. No. 13/945,689, filed Jul. 18, 2013, entitled "ADAPTIVE M2M BILLING," both assigned to the assignee of the present invention, all of which are incorporated herein by reference in their entireties.

FIELD OF THE INVENTION

The present invention is directed toward networks and more particularly to a method and system for providing application specific information related to reconciliation billing in such networks.

BACKGROUND

Machine to Machine (M2M) systems networks are utilized to provide communications between machines. In an M2M system, typically one or more machines using network resources communicates with a remote application infrastructure for the purposes of monitoring and controlling either the "machine" itself or the surrounding environment. There is a desire to accurately utilize the application specific billing information associated with networks of this type, to identify and remove billing discrepancies and to compare user operational data to provide a reconciliation for customer billing arrangements. The present invention is directed to such a need.

SUMMARY

In one or more embodiments, a computer implemented method is disclosed. The computer implemented method includes receiving application usage information regarding the one or more billable activities for one or more devices from an application provider core by a billing and analytic system; receiving cloud service usage information regarding the one or more billable activities for the one or more devices from a cloud operator providing cloud services by a billing and analytic system; comparing the received application usage information and the received cloud service usage information for one or more discrepancies in relation to one or more billable activities by a reconciliation engine; and reporting one or more identified discrepancies in accordance with the one or more billable activities.

A further embodiment of the present invention provides for a system for use in an machine to machine (M2M) network, the system includes: a reconciliation engine for comparing received application usage information regarding one or more billable activities and received cloud service usage information regarding one or more billable activities for one or more discrepancies in relation to one or more billable activities; and a billing and analytics system for i) receiving the application usage information from an application service provider and the received cloud service usage information from cloud service provider and ii) generating one or more reports in response to the reconciliation engine identifying one or more discrepancies.

The present invention also provides for a computer program product stored on a non-transitory computer readable medium for use in machine to machine (M2M) network; containing program instructions for: receiving application usage information regarding the one or more billable activities for one or more devices from an application provider core by a billing and analytic system; receiving cloud service usage information regarding the one or more billable activities for the one or more devices from a cloud operator providing cloud services by a billing and analytic system; comparing the received application usage information and the received cloud service usage information for one or more discrepancies in relation to one or more billable activities by a reconciliation engine; and reporting one or more identified discrepancies in accordance with the one or more billable activities.

DETAILED DESCRIPTION

The present invention is directed toward networks and more particularly to a method and system for providing information related to application specific billing in such networks.

The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 1:
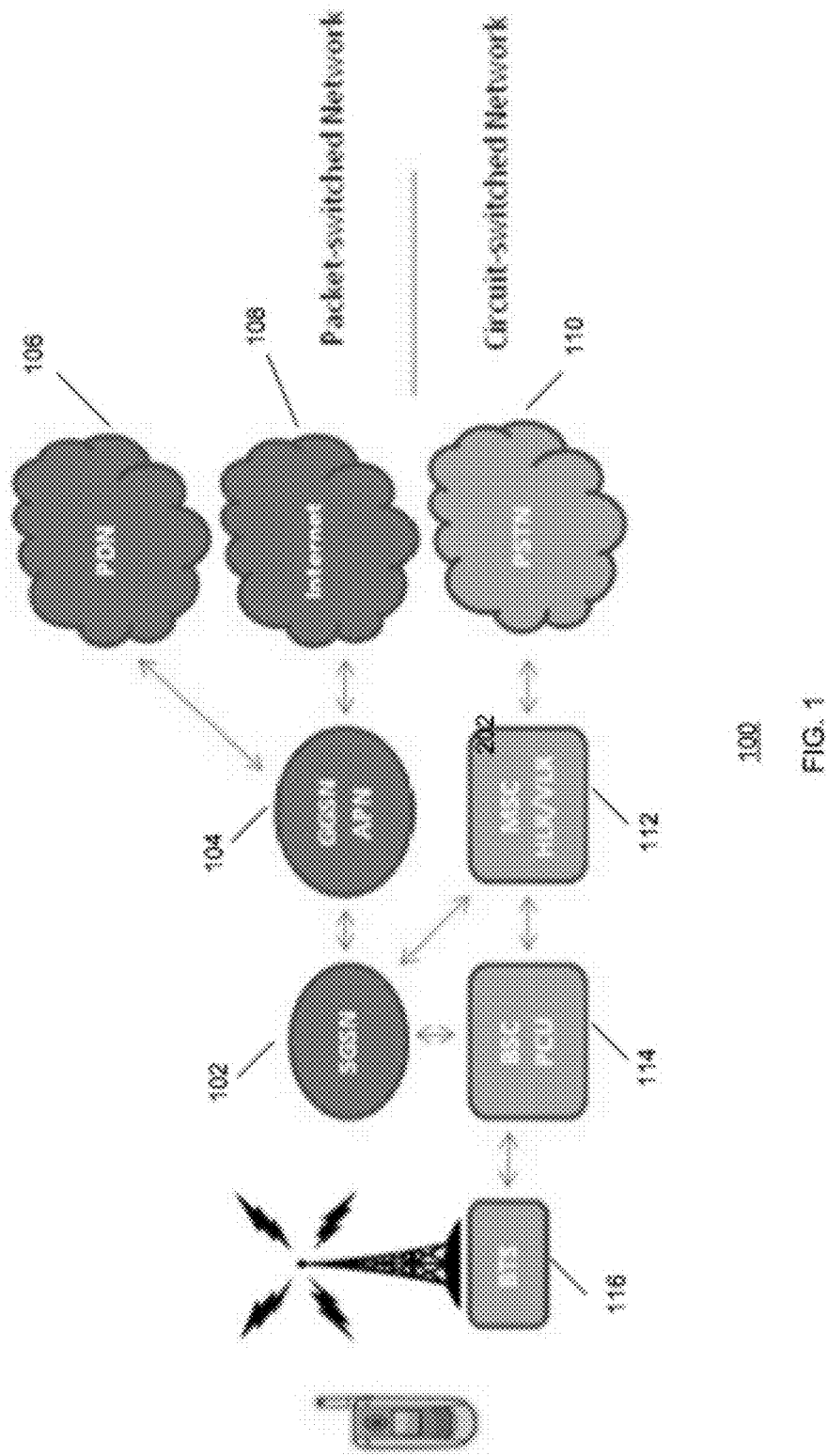
FIG. 1 illustrates a block diagram of a basic M2M network.

FIG. 1 illustrates a block diagram of a basic M2M network 100. The M2M network 100 comprises a circuit-switched voice network 193 that connects mobile handsets 192 with the public switched telephone network (PSTN) 110. Overlaid on top of the network is a packet-switched data network 194. Although circuit-switched SMS messages are used in M2M applications, increasingly M2M data is sent in packet format.

Base station controllers (BSCs) 114 control a number of base transceiver stations (BTSs) 116 that control the actual radio towers and interact with the handsets 192. Packet control units (PCUs) 114 transfer packets bound for the General Packet Radio Service (GPRS) network to a local service GPRS support node (SGSN) 102. Home location registers (HLRs) are a function on both the GSM and GPRS network, and essentially serves to identify mobile stations/end-points with specific account information. The SGSN establishes the packet data protocol (PDP) context with the Gateway GPRS support node (GGSN) 10. Upon activation packets bound for external networks (e.g., the Internet 108 or corporate private data networks (PDNs) 106) pass through the mobile packet gateway. Each mobile network gateway contains a number of virtual and physical access point nodes (APNs) 104 that define the specific external network, whether public or private, to which the packet is destined.

Mobile packet gateways like GGSNs along with HLRs are two of the most critical network elements relative to M2M service deliver in the mobile network. Mobile packet gateways provide security, Quality of Service (QoS) enforcement, and interaction with charging and billing systems for mobile data service. Mobile packet gateways are also central to interconnecting the mobile infrastructure with 3rd-party networks, most importantly ASPs in the case of the M2M market. HLRs are critical to service creation and management of remote devices in the field.

As used herein the term M2M communication is understood to include methods of utilizing various connected computing devices, servers, clusters of servers, wired and/or wirelessly, which provide a networked infrastructure to deliver computing, processing and storage capacity as services where a user typically accesses.

Figure 2:
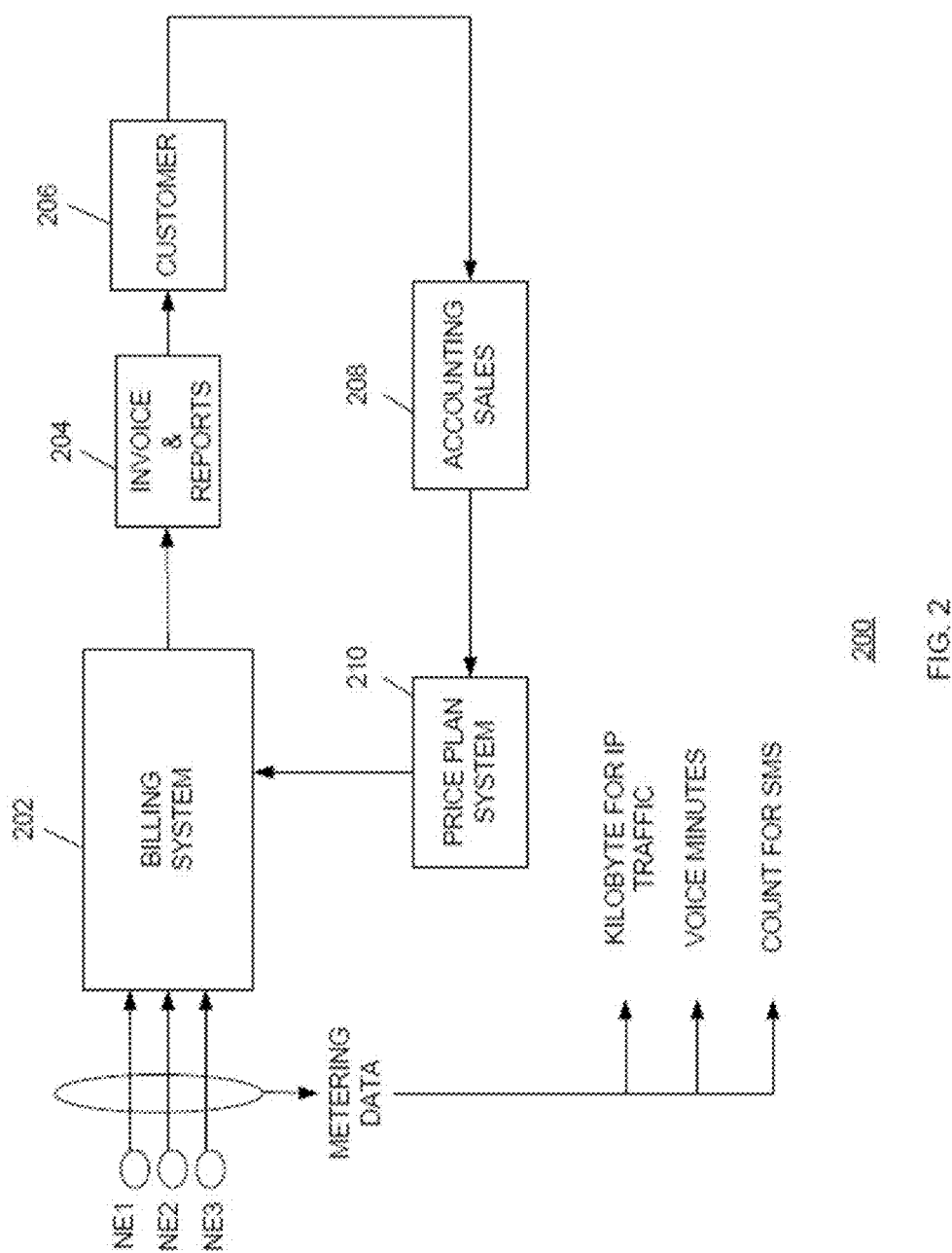
FIG. 2 illustrates a conventional billing system architecture.

FIG. 2 illustrates a conventional billing system architecture 200 utilized with M2M networks. The architecture 200 includes a network having network elements (NEx) (e.g. devices connected to the network such as machines, phones, communicators, etc.) 201A, 201B, 201C, a billing and administration system (BAS) 202, an invoice and reporting function 204, a customer function 206, an accounting and sales function 208, and a price plan system 210.

The BAS 202 provides for receiving data input from the NEs and also provides for calculating and determining billing and related administrative information for customer accounts in relation to the NE devices being used on the associated network; the calculated billing and related administrative information is provided as input to the invoice and reporting function. The invoice and reporting function 204 provides for generating an invoice based on an arrangement between the network operator and the customer, typically in the form of a billing relating information about expenses arising from the NEs activity associated with the operator's network. Once input data is processed by the invoice and reporting function, billing details and routing of invoices, as one example, are then output to the customer function 206 in accordance with customer account details.

The customer function 206 provides for interaction with the customer and includes providing for arranging billing to the customer as well as receiving input from the customer (such as with discrepancies, account updates, device updates, other communications, etc.). Updates and requests from the customer function are input to the accounting and sales function 208. The accounting and sales function 208 may update, add, subtract and otherwise modify information associated with a customer's account, including device updates and billing plans, such that the BAS processing more accurately reflects the activities and administrative aspects of the customer account. The accounting and sales function 208 will output information to the Price Plan system including modifications to a customer's pricing plan and updated pricing plans available to the customer to better reflect a customer's needs. The Price Plan system 210 provides for information concerning the available billing, usage, device activity and associated network operations information concerning a customer's account. The pricing plans of a Price Plan system 210 may change from time to time to better reflect customer and market needs. The Price Plan system 210 outputs updates of the Price Plan as input to the BAS 202.

From FIG. 2, operatively, after receiving input of the NEs and the associated Price Plan system information, the BAS calculates a customer's bill based upon the price plan for the network elements. The calculated bill is output as input to the invoice and reporting function. The invoice and reporting function then generates invoices and routes the invoices to the customer, along with other reports as may be defined by the customer or operator. The customer receives the billings and reports via the customer function and may provide feedback or additional response, which when received is input to the accounting and sales function (e.g. accounting department) may then act in response to the customer feedback to adjust a billing, modify the account, adjust a price plan, and similar. Output from the accounting and sales function is processed by the Price Plan System to update pricing plan information which is then used by the BAS to calculate billings in a further activity.

Figure 3:
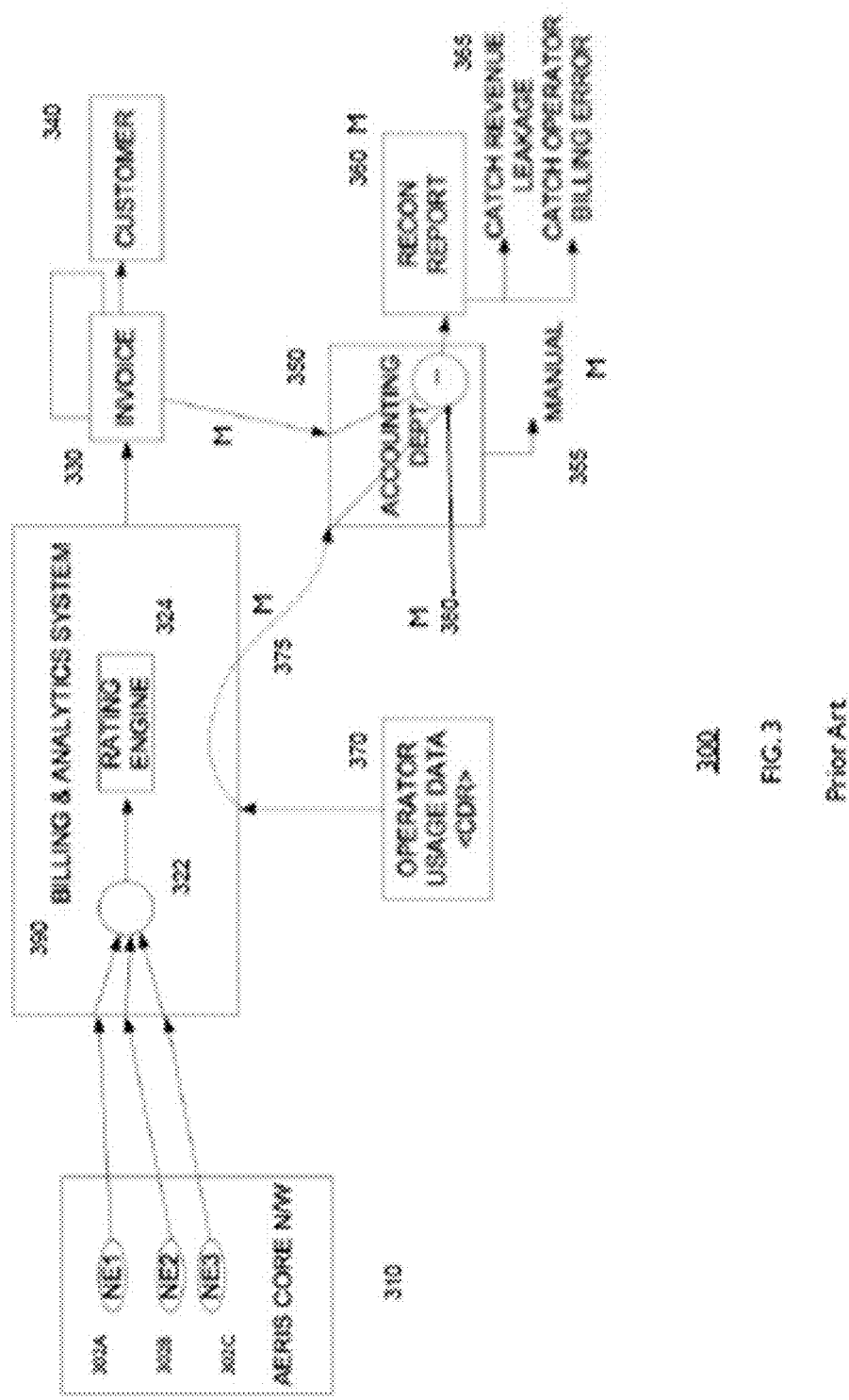
FIG. 3 illustrates a billing system architecture in accordance with an embodiment of the present invention in which billing invoices are provided in response to one or more of a customer's network elements requiring manual interactions.

FIG. 3 illustrates a billing system architecture 300 in which billing invoices 330 are provided in response to one or more of a customer's network elements 302A, 302B, 302C, requiring manual interactions. From FIG. 3, one or more NEs (302A, 302B, 302C) of a core network 310 communicate with a BAS 390 which is used for generating one or more invoices in response to information received from the network elements and operator usage data (CDR) 370, associated with the network. CDR data may include information in addition to typical NE collected data as determined by the operator. CDR data may be used in some instances as input to a more complex BAS. CDR data is typically of interest to an accounting department 350 as well however such data is provided manually (M) at 375.

Additionally from FIG. 3, data received from the NEs as input to the BAS 390 at 322 is rated by a rating engine 324 for billing preparation. Invoices are prepared at 330 and issued to a customer at 340. An invoice copy may then be issued to an accounting department at 350, manually (M) or automatically. The accounting department 350, through a manual process (M), compares invoicing and CDR to identify leakage issues (i.e., overbilling and underbilling) at 380 and will manually generate a recon report at 360. The recon report is typically a manually-intensive effort (M) to catch revenue leakages 365 and operator billing error 365. In some situations, a single individual is responsible for thousands of devices having billable activity and leakage detection and correction in advance of billing is a preferably alternative to errorful billings.

Accordingly, there is a desire to accurately utilize the billing information associated with networks of this type (i.e. M2M) to identify and remove billing discrepancies and to compare user operational data to provide an accurate reconciliation for customer billing arrangements in advance. The present invention is directed to such a need.

Figure 4:
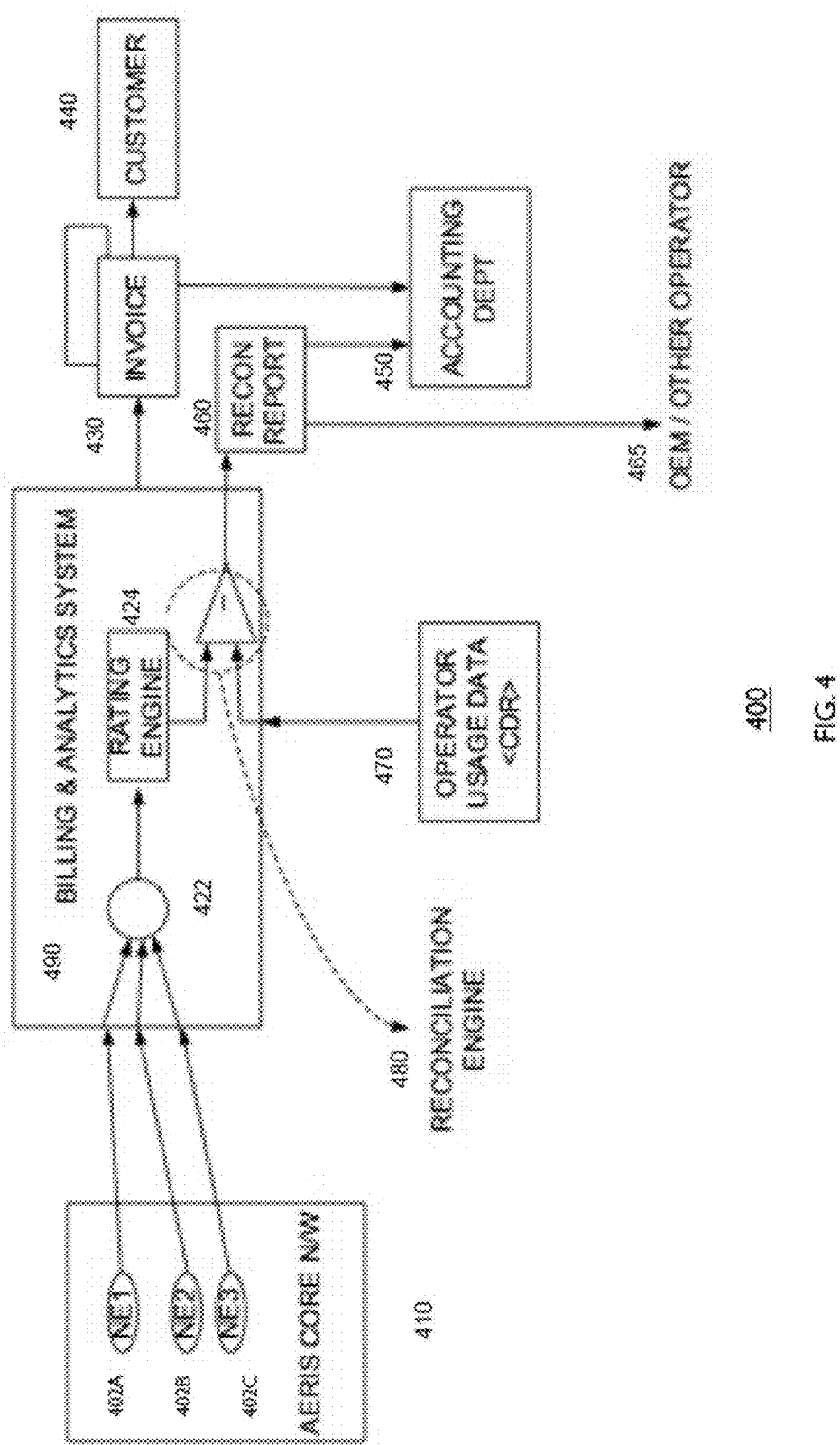
FIG. 4 illustrates an automated billing and analytics system (BAS) architecture in which an automated recon report is generated in relation to an automated reconciliation engine which compares ratings output from a rating engine regarding one or more of a customer's network elements and Operator Usage Data (CDR).

FIG. 4 illustrates an automated billing and analytics system (BAS) architecture 490 in which an automated recon report 460 is generated in relation to an automated reconciliation engine 480 which compares ratings from a rating engine 424 regarding one or more of a customer's network elements 402A, 402B, 402C, and CDR data 470. The BAS also generates one or more invoices 430 which are then provided to a customer 440 and the accounting department 450. The recon report 460 is provided to the accounting department 450 and optionally to an OEM or other operator at 465, providing a report that catches revenue leakage and operator billing error in advance, in accordance with one or more embodiments of the present invention.

From FIG. 4, in one embodiment, each NE (402A, 402B, 402C) of a core network 410 provides data regarding usage of a device or activity via 422 to the automated BAS 490. A rating engine 424 associates the provided data into a rating scheme in accordance with a predetermined manner which may rank the information by activity, event, device, time, customer, etc. Each ranked activity is output from 424 to the reconciliation engine 480. Similarly, data from the CDR is also input to the automated BAS 490 and is provided to the reconciliation engine at 480.

The reconciliation engine 480 comparatively reads and matches each activity of each NE with its associated activity present in the CDR data. The reconciliation engine then identifies differences, if any, between the received data regarding activities of the NE sourced information and the CDR sourced information. Data which is identified as having differences, between one sourced data set and another, is identified in a reconciliation report (i.e., recon report) at 460. The recon report may be electronic, displayed or otherwise generated for use. The accounting department 450 is then able to utilize the recon report to update the billing information and invoicing activities, and may alternatively provide the recon report, or portions of the report, to an OEM or other operator at 465. In a further embodiment, the accounting department 450 may use the information of the recon report to further adjust billing information for the customer by updating or otherwise modifying the pricing plan system.

As used herein, each NE (402A, 402B, 402C) may provide data to the BAS 490 in a variety of ways such as by streaming the data, sharing the data and/or batch delivering the data, where, for each situation, the routine of how much data, what type of delivery and when the data is provided to the BAS may also vary by NE device. NE1-NE3 could be any type of device, appliance, terminal, remote device, wireless asset, etc. are intended to be inclusive, interchangeable, and/or synonymous with one another and other similar communication-based equipment for purposes of the present invention though one will recognize that functionally each may have unique characteristics, functions and/or operations which may be specific to its individual capabilities and/or deployment.

Data received by the BAS 490 from a typical NE, for example, may include caller information, usage information, network access times, one or more dates of access, geographical information, origination and destination of communication information, etc.

It will be further appreciated by those skilled in the art that the present invention, in one or more embodiments, provides for utilizing the billing information associated with networks of this type (i.e. M2M) to identify and remove billing discrepancies and to compare user operational data to provide an accurate reconciliation for customer billing arrangements in advance billing details, such as invoicing, using the billing system architecture of the present invention.

Figure 5:
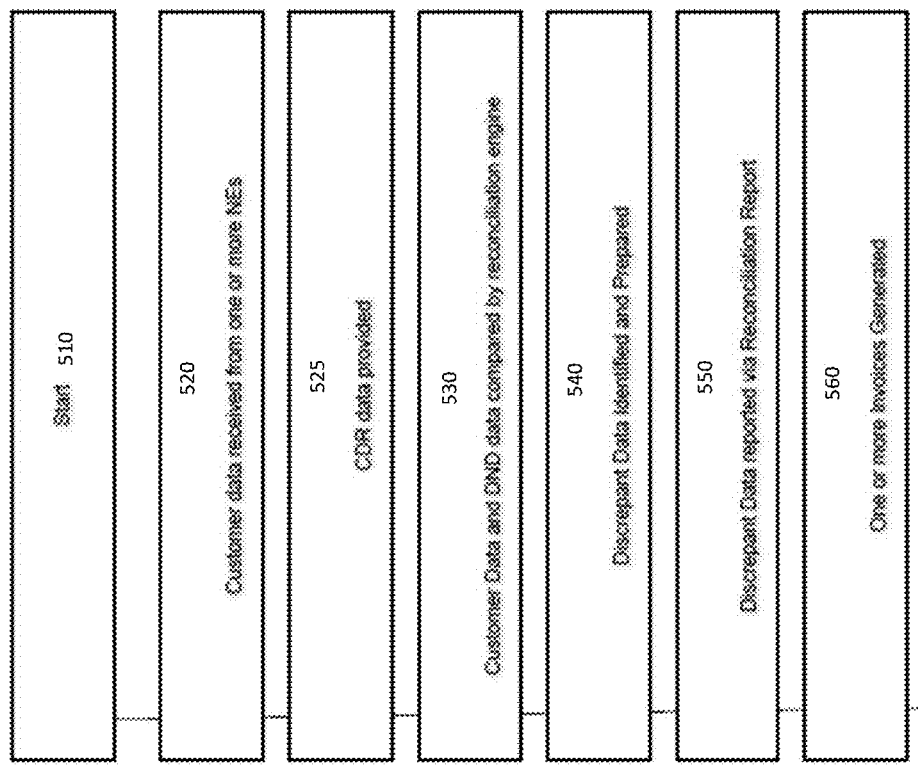
FIG. 5 is a block diagram of an operative billing and analytics architecture of a computer implemented method for use in machine to machine (M2M) network in accordance with an embodiment.

FIG. 5 is a block diagram of an operative billing and analytics architecture of a computer implemented method for use in machine to machine (M2M) network in accordance with an embodiment.

From FIG. 5, the present invention starts an operation at 510. At 520, customer data is received from one or more network elements (NEs) to a BAS. Preferably, data received from the NEs is first rated by a rating engine. At 525, CDR data is provided to the BAS. At 530, the received CDR data and the received and rated NE information is compared for discrepancies or differences by a reconciliation engine. At 540, the compared data is then identified and prepared for reconciliation to the accounting department. In a preferred embodiment, the reconciliation engine, based on a set of one or more predetermined rules, is able to reconcile identified differences of the compared data and adjudge a final position for certain of the data identified as being discrepant.

At 550, the discrepant data is then prepared for being generating into one or more reconciliation reports. At 560, the one or more recon reports are generated and are forwarded to the accounting department, customer(s), OEM(s) and others as may be directed.

In a preferred embodiment, the present invention provides for a computer implemented method which receives customer information from one or more network elements and operator usage information from one or more data sources. The method compares the received customer information and the received operator usage information for one or more discrepancies in relation to one or more billable activities. Where one or more discrepancies are identified, the method then reports the one or more identified discrepancies, via a reconciliation engine and reconciliation reporting function, in accordance with the one or more billable activities. Preferably, an automatic generation and routing of reports is arranged for each customer where the reconciliation engine and report generator are software based. In one or more implementations, a price plan system associated with a BAS of the present invention, is updated to reflect optimized billing and pricing to reduce leakages identified from repeat discrepancies via the reconciliation engine.

In a further preferred arrangement, the method includes rating the received customer information in a predetermined order and comparing the rated customer information with the received operator usage information in accordance with the predetermined order. The rating of the information may be provided for in a diversity of schemes and is optimized where the rating is associated with one or more billable events.

Figure 6A:
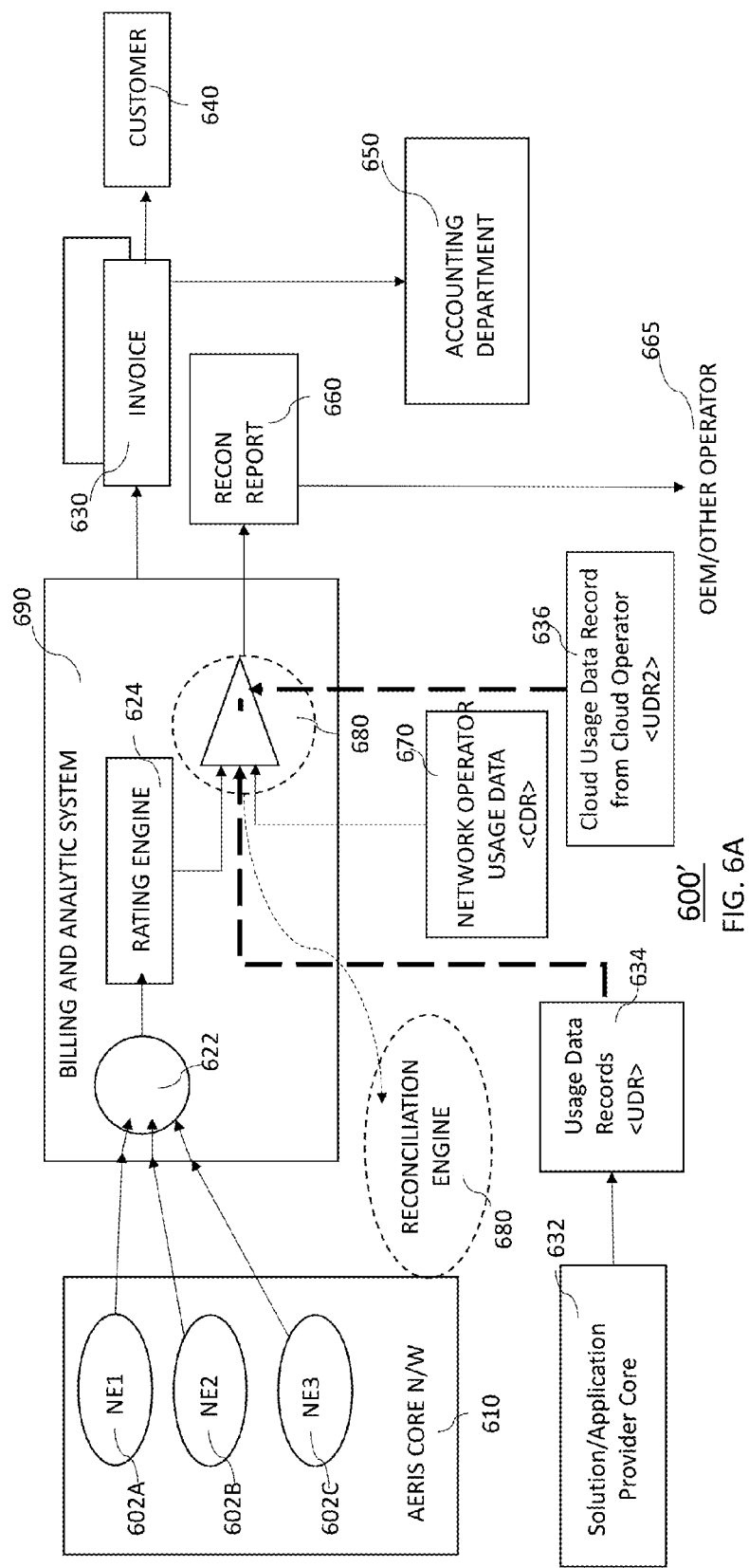
FIGS. 6A and 6B illustrate application specific automated billing and analytics system (BAS) architecture in which an automated recon report is generated in relation to an automated reconciliation engine in accordance with one or more embodiments.
Figure 6B:
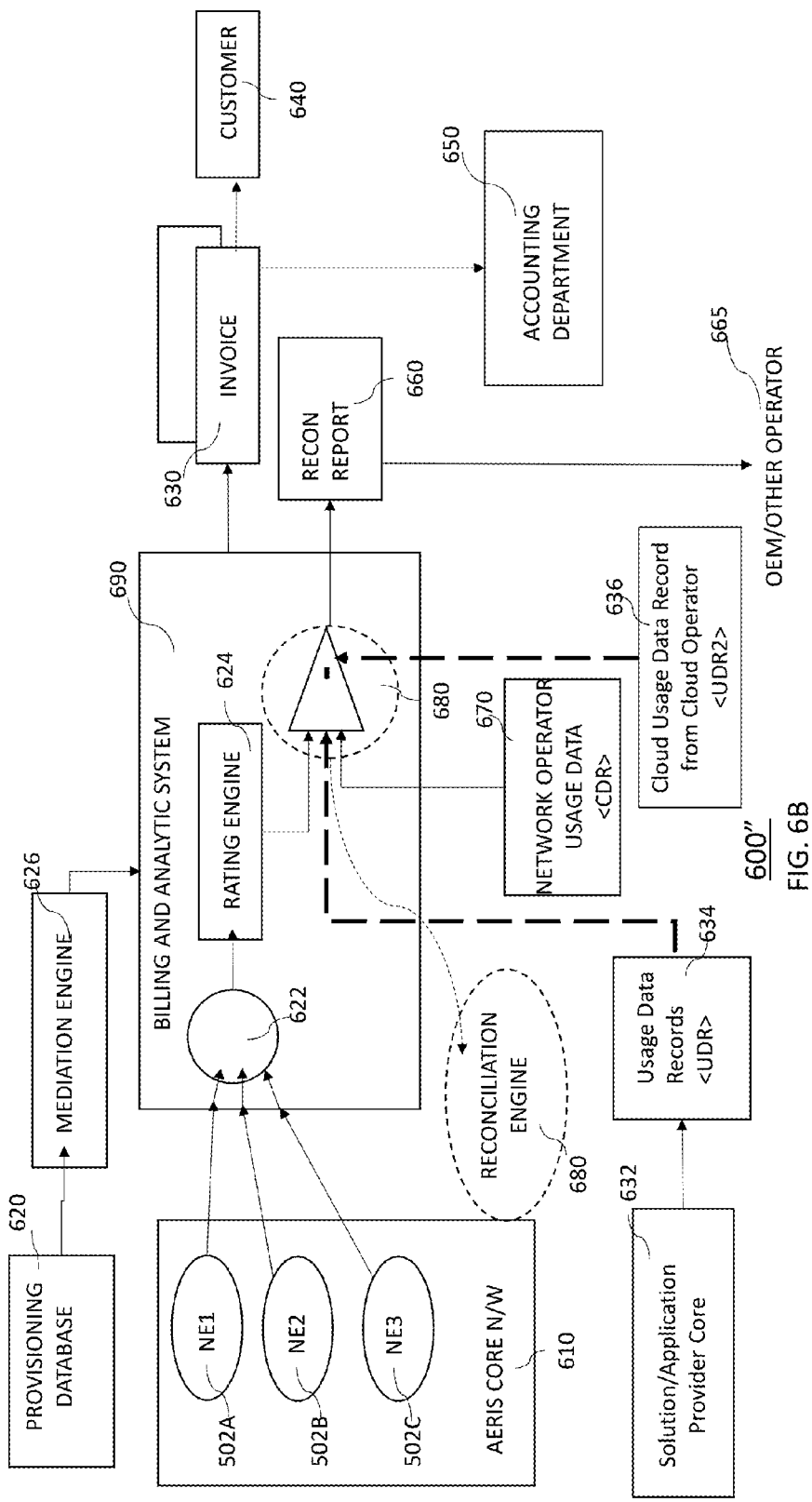

FIGS. 6A and 6B illustrate automated billing and analytics system (BAS) architecture 690 in which an automated reconciliation report 660 for specific applications is generated in relation to an automated reconciliation engine 680 in accordance with one or more embodiments.

From FIG. 6A, in one embodiment, an application and/or solution provider core 632 monitors and records application and/or solution usage by a device through usage data record (UDR) 634 and a cloud service provider or cloud operator monitors and records cloud services usage data record (UDR2) 636, for example, a cloud operator may provide storage and/or access services.

The application and/or solution provider core 632 may be a server providing service and data processing for IoT devices using IoT application and/or solutions. The application and/or solution provider core 632 may be a physical server or may reside in cloud. Alternatively or additionally, the application and/or solution provider core 632 may be a device, appliance, terminal, remote device, or wireless asset. As used herein, the term "application" may include one or more applications, or a solution having one or more applications and may include additional software or hardware components. The application and/or solution usage data record (UDR) 634 may be generated regarding one or more billable activities/events of the device. The application and/or solution UDR 634 generated may include any of device and/or account information including state of the device, usage information including the amount of data transferred and/or stored, network access times, one or more dates of access, geographical information, origination and destination of communication information, etc. or a combination thereof.

The BAS 690 may compare ratings from a rating engine 624 regarding application specific Operator Usage Data (UDR) 634 and the cloud services usage data record (UDR2) 636. The cloud service usage data record (UDR2) 636 may be generated regarding one or more billable activities/events of the devices. The cloud service usage data record (UDR2) 636 may include any of information regarding usage of cloud services by the device or the group of devices, for example, device and/or account information including state of the device, usage information including amount of data transferred and/or stored, network access times, one or more dates of access, geographical information, origination and destination of communication information, application and/or solution for which the cloud services were used etc. or a combination thereof.

A rating engine 624 may associate the provided data into a rating scheme in accordance with a predetermined manner which may rank the information by activity, event, device, time, customer, etc. Each ranked activity may be output from 624 to the reconciliation engine 680. The usage data record UDR 634 data, which may be rated or unrated, is input to the automated BAS 690 and is provided to the reconciliation engine at 680. A cloud operator providing cloud services such as cloud computing and/or storage also monitors usage of cloud services by the device using specific applications and/or solutions and generates cloud operator's usage data record UDR2 636. The cloud service usage data record (UDR2) may include information regarding usage of cloud services by the device or the group of devices, for example, time of use, amount of data used and application and/or solution for which the cloud services were used.

The reconciliation engine 680 comparatively reads and matches each activity or usage data record UDR 634 reported by the application and/or solution provider core 632 with its associated activity present in the UDR2 data 636 reported by the cloud operator. The reconciliation engine then identifies differences, if any, between the received data regarding activities of the application and/or solution provider core 632 sourced information UDR 634 and the cloud operator sourced information UDR2 636. Data which is identified as having differences, between one sourced data set and another, is identified in a reconciliation report (i.e., recon report) at 660. The recon report 660 may be electronic, displayed or otherwise generated for use.

The accounting department 650 is then able to utilize the recon report 660 to update the billing information and invoicing activities, and may alternatively provide the recon report 660, or portions of the report, to an OEM or other operator at 665. In a further embodiment, the accounting department 650 may use the information of the recon report 660 to further adjust billing information for the customer 640 by updating or otherwise modifying the pricing plan system.

The BAS 690 may then generate one or more invoices 630 which are then provided to a customer 640 and the accounting department 650. The recon report 660 is provided to the accounting department 650 and optionally to an OEM or other operator at 665, providing a report that catches revenue leakage and operator billing error in advance, in accordance with one or more embodiments of the present invention.

As illustrated in FIG. 6B, in addition to the application specific Operator Usage Data (UDR) 634 and the cloud services usage data record (UDR2) 636 as described in the description accompanying FIG. 6A, another set of usage data may be captured and transmitted by the network elements 602A, 602B, 602C to the rating engine 624, as the application and/or solution running on the devices transmits data using network elements 602A, 602B, 602C, for example, NE1, NE2, NE3 etc. similar to description accompanying FIG. 4.

Alternatively, another set of usage data may be captured and transmitted by the network elements 602A, 602B, 602C to the rating engine 624, as the application and/or solution running on the devices transmits data using network elements 602A, 602B, 602C, for example, NE1, NE2, NE3 etc. similar to description accompanying FIG. 4 as an alternative to the application specific Operator Usage Data (UDR) 634 or the cloud services usage data record (UDR2) 636 as described in the description accompanying FIG. 6A.

As used herein, the term "application" may include one or more applications, or a solution having one or more applications and may include additional software or hardware components. A provisioning database 620 that provisions the device using a specific application and/or solution via mediation engine 626 enables linking of the network usage of the device recorded by the network elements NEs 602A, 602B, 602C to specific application and/or solution.

The BAS 690 may compare ratings from a rating engine 624 regarding one or more of a customer's network elements 602A, 602B, 602C with the application specific Operator Usage Data (UDR) 634 and/or the cloud services usage data record (UDR2) 636. Each NE (602A, 602B, 602C) of a core network 610 may provide data regarding usage of a device or network activity of the device via permanent storage and/or long term archive 622 to the automated BAS 690. The permanent storage and/or long term archive 622 stores the data and makes it available for data analytics. A rating engine 624 associates the provided data into a rating scheme in accordance with a predetermined manner which may rank the information by activity, event, device, time, customer, etc. Each ranked activity is output from 624 to the reconciliation engine 680.

The reconciliation engine 680 comparatively reads and matches each activity reported by the network elements with the usage data record UDR 634 reported by the application and/or solution provider core 632 and/or its associated activity present in the UDR2 data 636 as explained in the description accompanying FIG. 6A. As described above, the application and/or solution provider core 632 may be a server providing service and data processing for IoT devices using IoT application and/or solutions. The application and/or solution provider core 632 may be a physical server or may reside in cloud. Alternatively or additionally, the application and/or solution provider core 632 may be a device, appliance, terminal, remote device, or wireless asset.

The reconciliation engine then identifies differences, if any, between the received data regarding activities of the application and/or solution provider core 632 sourced information UDR 634 and the cloud operator sourced information UDR2 636. Data which is identified as having differences, between one sourced data set and another, is identified in a reconciliation report (i.e., recon report) at 660. The recon report 660 may be electronic, displayed or otherwise generated for use.

The accounting department 650 is then able to utilize the recon report 660 to update the billing information and invoicing activities, and may alternatively provide the recon report 660, or portions of the report, to an OEM or other operator at 665. In a further embodiment, the accounting department 650 may use the information of the recon report 660 to further adjust billing information for the customer 640 by updating or otherwise modifying the pricing plan system.

The BAS 690 may then generate one or more invoices 630 which are then provided to a customer 640 and the accounting department 650. The recon report 660 is provided to the accounting department 650 and optionally to an OEM or other operator at 665, providing a report that catches revenue leakage and operator billing error in advance, in accordance with one or more embodiments of the present invention.

As used herein, each NE (602A, 602B, 602C) may provide data to the BAS 690 in a variety of ways such as by streaming the data, sharing the data and/or batch delivering the data, where, for each situation, the routine of how much data, what type of delivery and when the data is provided to the BAS may also vary by NE device. NE1-NE3 could be any type of device, appliance, terminal, remote device, wireless asset, etc. are intended to be inclusive, interchangeable, and/or synonymous with one another and other similar communication-based equipment for purposes of the present invention though one will recognize that functionally each may have unique characteristics, functions and/or operations which may be specific to its individual capabilities and/or deployment.

Data received by the BAS 690 from a typical NE, for example, may include caller information, usage information, network access times, one or more dates of access, geographical information, origination and destination of communication information, etc.

This additional reconciliation using another set of usage data records captured by network elements may be achieved if the network provider 610 and the application and/or solution provider 632 are the same entities.

However, the network provider, for example, CORE N/W 610, and the application and/or solution provider for example, Solution/Application Provider Core 632 as well as cloud operator may be the same or different entities.

In the situation where the Network provider/operator is an entity that is same or different from the Solution/Application provider, the network operator may provide another set of data, known as network operator usage data record CDR 670 similar to the description accompanying FIG. 4, either alternatively or in addition to the usage data record UDR 634 reported by the application and/or solution provider core 632 and/or usage data record UDR2 636 reported by the cloud operator. This data CDR 670 provided by the network operator may also be used either alternatively or in addition to the UDR and/or UDR2 for reconciliation by the reconciliation engine 680 as illustrated in FIGS. 6A and 6B. CDR data 670 may include information in addition to typical NE collected data as determined by the operator. CDR data 670 may be used in some instances as input to the automated BAS 690 and is provided to the reconciliation engine at 680.

The reconciliation engine 680 comparatively reads and matches each activity of Solution/application provider core and/or cloud operator with its associated activity present in the CDR data 670. The reconciliation engine then identifies differences, if any, between the received data regarding activities of the Solution/application provider core and/or cloud operator sourced information and the CDR sourced information. Data which is identified as having differences, between one sourced data set and another, is identified in a reconciliation report (i.e., recon report) at 660. The recon report may be electronic, displayed or otherwise generated for use. The accounting department 650 is then able to utilize the recon report to update the billing information and invoicing activities, and may alternatively provide the recon report, or portions of the report, to an OEM or other operator at 665. In a further embodiment, the accounting department 650 may use the information of the recon report to further adjust billing information for the customer by updating or otherwise modifying the pricing plan system.

The BAS 690 may then generate one or more invoices 630 which are then provided to a customer 640 and the accounting department 650. The recon report 660 is provided to the accounting department 650 and optionally to an OEM or other operator at 665, providing a report that catches revenue leakage and operator billing error in advance, in accordance with one or more embodiments of the present invention.

It will be further appreciated by those skilled in the art that the present invention, in one or more embodiments, provides for utilizing the billing information associated with networks of this type (i.e. M2M) to identify and remove billing discrepancies and to compare user operational data related to specific application and/or solution to provide an accurate reconciliation for customer billing arrangements in advance billing details, such as invoicing, using the billing system architecture of the present invention.

Figure 7A:
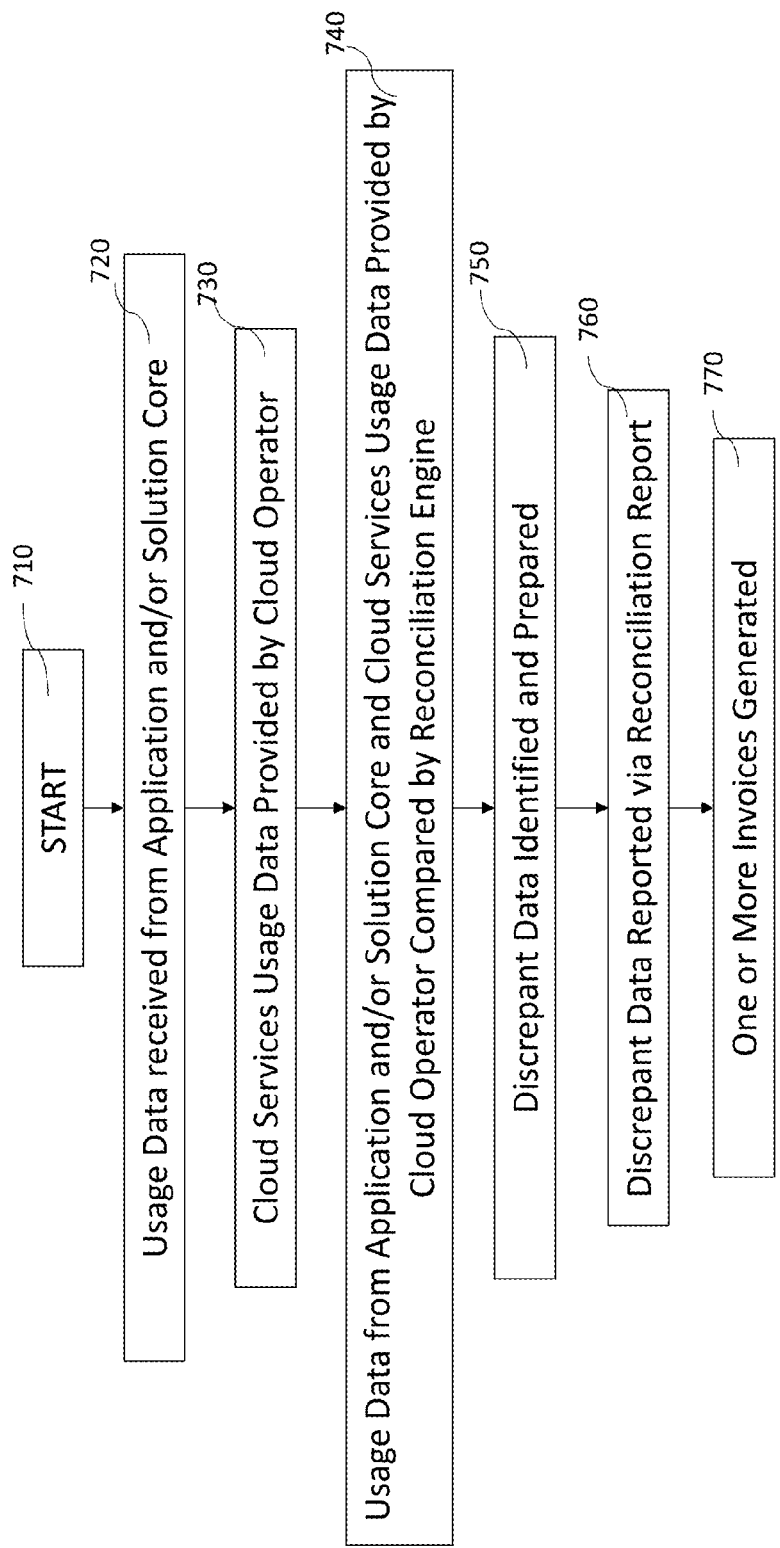
FIGS. 7A and 7B illustrate block diagrams of operative application specific billing and analytics architecture of computer implemented methods for use in machine to machine (M2M) network in accordance with one or more embodiments.
Figure 7:

FIGS. 7A and 7B illustrate block diagrams of operative billing and analytics architectures of a computer implemented method for use in application specific machine to machine (M2M) network in accordance with one or more embodiments.

From FIG. 7A, corresponding to the system illustrated in FIG. 6A, the present invention starts an operation at 710. At 720, usage data for a device using the application and/or solution is received from application and/or solution provider core to a billing and analytics system (BAS). The application and/or solution provider core may be a server providing service and data processing for IoT devices using IoT application and/or solutions. The application and/or solution provider core 632 may be a physical server or may reside in cloud. Alternatively or additionally, the application and/or solution provider core may be a device, appliance, terminal, remote device, or wireless asset. As used herein, the term "application" may include one or more applications, or a solution having one or more applications and may include additional software or hardware components. The application and/or solution usage data record may be generated regarding one or more billable activities of the device.

The data received from the application and/or solution provider core may be first rated by a rating engine. At 730, cloud service usage data for the device for using cloud services hosted by a cloud operator is provided to the BAS. The cloud service usage data record may include information regarding usage of cloud services by the device or the group of devices, for example, time of use, amount of data used and application and/or solution for which the cloud services were used.

At 740, the usage data from the application and/or solution core and the cloud services usage data provided by the cloud operator is compared for discrepancies or differences by a reconciliation engine. At 750, the compared data is then identified and prepared for reconciliation to the accounting department. In a preferred embodiment, the reconciliation engine, based on a set of one or more predetermined rules, is able to reconcile identified differences of the compared data and adjudge a final position for certain of the data identified as being discrepant.

At 760, the discrepant data is then prepared for being generating into one or more reconciliation reports. At 770, the one or more recon reports are generated and are forwarded to the accounting department, customer(s), OEM(s) and others including the application and/or service provider as may be directed.

In an embodiment, the present invention provides for a computer implemented method which receives application usage information for one or more devices from an application and/or solution provider and cloud service usage information for the device from a cloud operator providing cloud services. The method compares the received usage information for the one or more devices from the application and/or solution provider and the received cloud service usage information for the one or more devices from the cloud operator providing cloud services for one or more discrepancies in relation to one or more billable activities. Where one or more discrepancies are identified, the method then reports the one or more identified discrepancies, via a reconciliation engine and reconciliation reporting function, in accordance with the one or more billable activities. Preferably, an automatic generation and routing of reports is arranged for each customer and/or device or a group of devices where the reconciliation engine and report generator are software based. In one or more implementations, a price plan system associated with a BAS of the present invention, is updated to reflect optimized billing and pricing to reduce leakages identified from repeat discrepancies via the reconciliation engine.

In a further arrangement, the method includes rating the received application usage information in a predetermined order and comparing the rated application usage information with the received cloud service usage information in accordance with the predetermined order. The rating of the information may be provided for in a diversity of schemes and is optimized where the rating is associated with one or more billable events.

From FIG. 7B, corresponding to the system described in FIG. 6B, the present invention starts an operation at 710. At 720, usage data for one or more devices using the application and/or solution is received from application and/or solution provider core to a BAS. Data received from the application and/or solution provider core may be rated by a rating engine. The application and/or solution provider core may be a server providing service and data processing for IoT devices using IoT application and/or solutions. The application and/or solution provider core may be a physical server or may reside in cloud. Alternatively or additionally, the application and/or solution provider core may be a device, appliance, terminal, remote device, or wireless asset. As used herein, the term "application" may include one or more applications, or a solution having one or more applications and may include additional software or hardware components.

Additionally or alternatively, At 725, customer data is received from one or more network elements (NEs) to a BAS similar to description accompanying FIG. 5. The network usage of the device recorded by the network elements NEs is linked to specific application and/or solution by a provisioning database that provisions the device using a specific application and/or solution via mediation engine. The data received from the NEs may be first rated by a rating engine. This additional reconciliation using another set of usage data records captured by network elements may be achieved if the network provider and the application and/or solution provider 632 are the same entities.

In the situation where the Network provider/operator is an entity that is same or different from the Solution/Application provider, the network operator may provide another set of data, known as network operator usage data record CDR similar to the description accompanying FIG. 5. The data received from the network operator may be rated by a rating engine.

At 730, cloud service usage data for the device for using cloud services hosted by a cloud operator is provided to the BAS. At 740, the cloud services usage data provided by the cloud operator and/or the usage data from the application and/or solution core, and customer usage data received from one or more network elements is compared for discrepancies or differences by a reconciliation engine. Alternatively, at 745, the cloud services usage data provided by the cloud operator and/or the usage data from the application and/or solution core, and the customer usage data received from the network operator is compared for discrepancies or differences by a reconciliation engine. At 750, the discrepant data is then identified and prepared for reconciliation to the accounting department. In an embodiment, the reconciliation engine, based on a set of one or more predetermined rules, is able to reconcile identified differences of the compared data and adjudge a final position for certain of the data identified as being discrepant.

At 750, the discrepant data is then prepared for being generated into one or more reconciliation reports at 760. At 770, the one or more recon reports are generated and are forwarded to the accounting department, customer(s), OEM(s) and others including the application and/or service provider as may be directed.

In an embodiment, the present invention provides for a computer implemented method which receives application usage information for a device or a group of devices from an application and/or solution provider, customer or device usage information received from one or more network elements and cloud service usage information for the device from a cloud operator providing cloud services. The method compares the received usage information for the device from an application and/or solution provider, customer or device usage information received from one or more network elements and the received cloud service usage information for the device from a cloud operator providing cloud services for one or more discrepancies in relation to one or more billable activities. Where one or more discrepancies are identified, the method then reports the one or more identified discrepancies, via a reconciliation engine and reconciliation reporting function, in accordance with the one or more billable activities. Preferably, an automatic generation and routing of reports is arranged for each customer and/or device or a group of devices where the reconciliation engine and report generator are software based. In one or more implementations, a price plan system associated with a BAS of the present invention, is updated to reflect optimized billing and pricing to reduce leakages identified from repeat discrepancies via the reconciliation engine.

In a further arrangement, the method includes rating the received customer or device usage information in a predetermined order and comparing the rated customer or device information with the received cloud service usage information in accordance with the predetermined order. The rating of the information may be provided for in a diversity of schemes and is optimized where the rating is associated with one or more billable events.

In another embodiment, the present invention provides for a computer implemented method which receives customer/device usage information from one or more network elements and cloud service usage information for the device from a cloud operator providing cloud services. The method then links the received customer usage information to at least one application provisioned on the device. The method compares the linked customer/device usage information and the received cloud service usage information for the device from a cloud operator providing cloud services for one or more discrepancies in relation to one or more billable activities. Where one or more discrepancies are identified, the method then reports the one or more identified discrepancies, via a reconciliation engine and reconciliation reporting function, in accordance with the one or more billable activities. Preferably, an automatic generation and routing of reports is arranged for each customer where the reconciliation engine and report generator are software based. In one or more implementations, a price plan system associated with a BAS of the present invention, is updated to reflect optimized billing and pricing to reduce leakages identified from repeat discrepancies via the reconciliation engine.

In a further arrangement, the method includes rating the received customer/device usage information in a predetermined order and comparing the rated customer/device usage information with the received cloud service usage information in accordance with the predetermined order. The rating of the information may be provided for in a diversity of schemes and is optimized where the rating is associated with one or more billable events.

In an embodiment, the present invention provides for a computer implemented method which receives application usage information for a device or a group of devices from an application and/or solution provider, customer or device usage information received from network operator and cloud service usage information for the device from a cloud operator providing cloud services. The method compares the received usage information for the device from an application and/or solution provider, customer or device usage information received from network operator and the received cloud service usage information for the device from a cloud operator providing cloud services for one or more discrepancies in relation to one or more billable activities. Where one or more discrepancies are identified, the method then reports the one or more identified discrepancies, via a reconciliation engine and reconciliation reporting function, in accordance with the one or more billable activities. Preferably, an automatic generation and routing of reports is arranged for each customer and/or device or a group of devices where the reconciliation engine and report generator are software based. In one or more implementations, a price plan system associated with a BAS of the present invention, is updated to reflect optimized billing and pricing to reduce leakages identified from repeat discrepancies via the reconciliation engine.

In an embodiment, the present invention provides for a computer implemented method which receives usage data from different sources comprising any of: application usage information for a device or a group of devices application and/or solution provider, customer or device usage information received from one or more network elements, customer or device usage information received from network operator and cloud service usage information for the device from a cloud operator providing cloud services, or a combination thereof. The method compares the received usage information from one source to the received usage information from another source for one or more discrepancies in relation to one or more billable activities. Where one or more discrepancies are identified, the method then reports the one or more identified discrepancies, via a reconciliation engine and reconciliation reporting function, in accordance with the one or more billable activities. Preferably, an automatic generation and routing of reports is arranged for each customer and/or device or a group of devices where the reconciliation engine and report generator are software based. In one or more implementations, a price plan system associated with a BAS of the present invention, is updated to reflect optimized billing and pricing to reduce leakages identified from repeat discrepancies via the reconciliation engine.

System Overview

Figure 8:
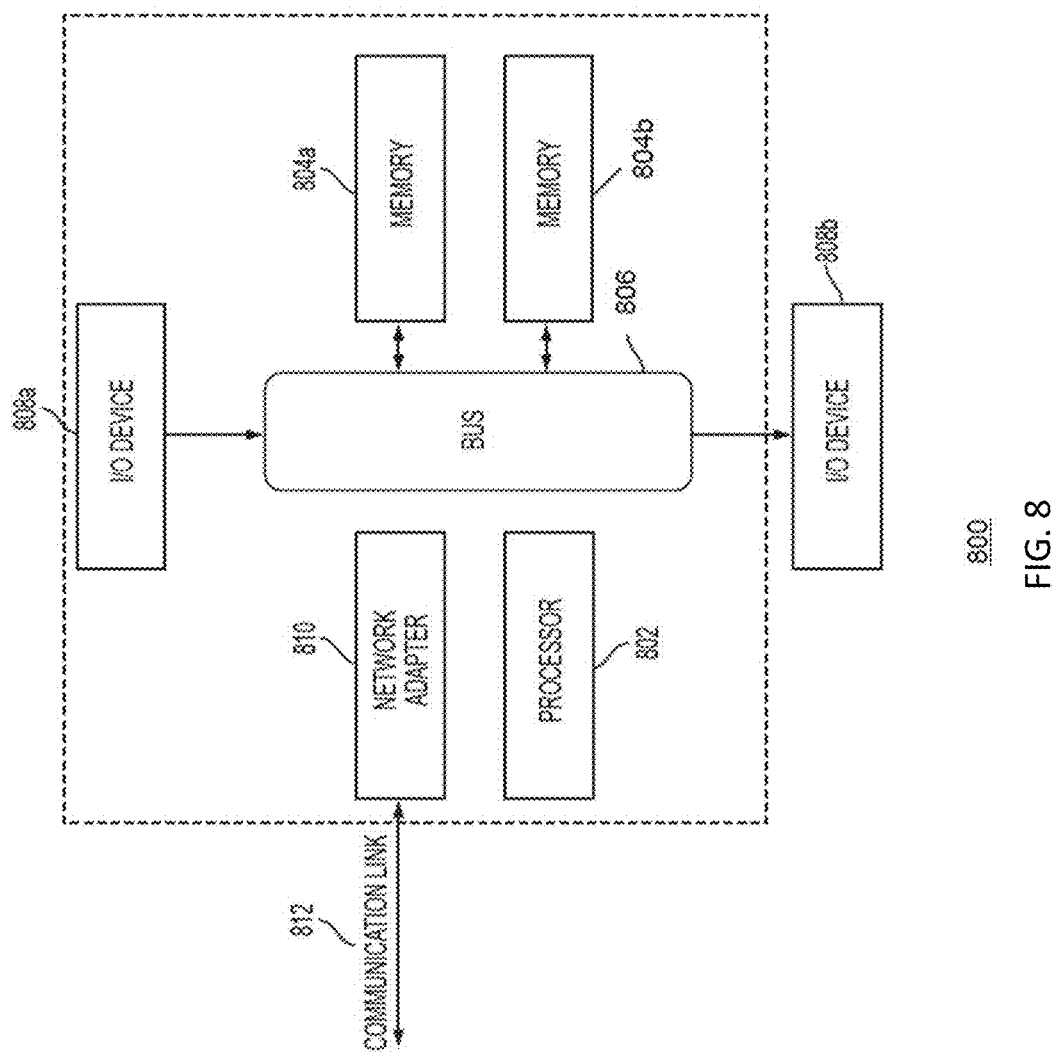
FIG. 8 illustrates a data processing system suitable for storing the computer program product and/or executing program code of the present invention in accordance with one or more embodiments.

FIG. 8 illustrates a data processing system 800 suitable for storing the computer program product and/or executing program code in accordance with an embodiment of the present invention. The data processing system 800 includes a processor 802 coupled to memory elements 804a-b through a system bus 806. In other embodiments, the data processing system 800 may include more than one processor and each processor may be coupled directly or indirectly to one or more memory elements through a system bus.

Memory elements 804a-b can include local memory employed during actual execution of the program code, bulk storage, and cache memories that provide temporary storage of at least some program code in order to reduce the number of times the code must be retrieved from bulk storage during execution. As shown, input/output or I/O devices 808a-b (including, but not limited to, keyboards, displays, pointing devices, etc.) are coupled to the data processing system 800. I/O devices 808a-b may be coupled to the data processing system 800 directly or indirectly through intervening I/O controllers (not shown).

In FIG. 8, a network adapter 810 is coupled to the data processing system 802 to enable data processing system 802 to become coupled to other data processing systems or remote printers or storage devices through communication link 812. Communication link 812 can be a private or public network. Modems, cable modems, and Ethernet cards are just a few of the currently available types of network adapters.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims. Many other embodiments of the present invention are also envisioned.

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow.

Similarly, it is envisioned by the present invention that the term communications network includes communications across a network (such as that of a M2M but not limited thereto) using one or more communication architectures, methods, and networks, including but not limited to: Code division multiple access (CDMA), Global System for Mobile Communications (GSM) ("GSM" is a trademark of the GSM Association), Universal Mobile Telecommunications System (UMTS), Long Term Evolution (LTE), 4G LTE, wireless local area network (WIFI), and one or more wired networks.

Accordingly, a system and method in accordance with one or more embodiments presented above overcomes the challenges of existing practices and provides a more robust and convenient architecture enabling improved information and billing details to be provided to a customer, operator or other. The present invention also provides for more accurate and aligned accounting of a user's revenues or expenses for an M2M or similar network. Furthermore such a system may minimize the need for customer feedback and concerns. Additionally, such a system and method in accordance with an embodiment can be utilized to identify new billing opportunities in such a network.

Embodiments described herein can take the form of an entirely hardware implementation, an entirely software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W).

What is claimed is:

1. A computer implemented method for use in machine to machine (M2M) network; the method comprising:
    receiving application usage information regarding one or more billable activities for one or more devices from an application provider core by a billing and analytic system;
    receiving cloud service usage information regarding the one or more billable activities for the one or more devices from a cloud operator providing cloud services by a billing and analytic system;
    comparing the received application usage information and the received cloud service usage information for one or more discrepancies in relation to one or more billable activities by a reconciliation engine; and
    reporting one or more identified discrepancies in accordance with the one or more billable activities.

2. The method of claim 1, wherein comparing the received application usage information and the received cloud service usage information further comprises:
    rating the received application usage information in a predetermined order and comparing the rated application usage information with the received cloud service usage information in accordance with the predetermined order.

3. The method of claim 2, wherein the predetermined order is associated with one or more billable events.

4. The method of claim 3, wherein the predetermined order includes rating the one or more billable events by a predetermined hierarchy for arranging the one or more billable activities in relation thereto.

5. The method of claim 4, wherein the method further comprises providing the report to a customer.

6. The method of claim 4, wherein the step of comparing is performed by a reconciliation engine.

7. The method of claim 5, wherein the method further includes updating a price plan system in response to the report.

8. The method of claim 7, wherein the updated price plan system includes billing updates to reduce leakage errors regarding customer billing.

9. The method of claim 7, wherein the report is generated by a report generator.

10. The method of claim 9, wherein the application provider core comprise any type of server, device, appliance, terminal, remote device, or wireless asset.

11. A system for use in an machine to machine (M2M) network, the system comprising:
    a reconciliation engine comprising a data processor, wherein the reconciliation engine compares received application usage information regarding one or more billable activities and received cloud service usage information regarding one or more billable activities for one or more discrepancies in relation to one or more billable activities; and
    a billing and analytics system including at least one storage database and one or more data processors wherein the billing and analytics system i) receives the application usage information from an application service provider and the received cloud service usage information from cloud service provider and ii) generates one or more reports in response to the reconciliation engine identifying one or more discrepancies.

12. The system of claim 11, wherein the application provider core comprise any type of server, device, appliance, terminal, remote device, or wireless asset.

13. The system of claim 12, wherein the billing and analytics system produces reports for the customer based upon the usage of the one or more applications in relation to the one or more billable events.

14. The system of claim 13, wherein the billing and analytics system includes a rating engine for rating the received application usage information in relation to one or more billable activities in a predetermined manner.

15. The system of claim 14, wherein the predetermined manner is associated with one or more billable events.

16. The system of claim 14, wherein the report is provided to one or more customers.

17. A computer program product stored on a non-transitory computer readable medium for use in machine to machine (M2M) network for Internet of Things (IoT); containing program instructions for:
    receiving application usage information regarding one or more billable activities for one or more devices from an application provider core by a billing and analytic system;
    receiving cloud service usage information regarding the one or more billable activities for the one or more devices from a cloud operator providing cloud services by a billing and analytic system;
    comparing the received application usage information and the received cloud service usage information for one or more discrepancies in relation to one or more billable activities by a reconciliation engine; and
    reporting one or more identified discrepancies in accordance with the one or more billable activities.

18. The computer program product of claim 17 which includes rating the received application usage information in a predetermined order and comparing the rated application usage information with the received cloud service usage information in accordance with the predetermined order.

19. The computer program product of claim 17, further including a customer function, an accounting function, and a price plan system, wherein the report provides reconciliation information to an accounts department function and the accounts function provides for modifying the price plan system to optimize the one or billable events for the customer function.

20. The computer program product of claim 17, wherein the application provider core comprise any type of server, device, appliance, terminal, remote device, or wireless asset.

21. A computer implemented method for use in machine to machine (M2M) network; the method comprising:
    receiving customer usage information regarding one or more billable activities from one or more network elements in relation to devices used on the associated network by a billing and analytic system;
    linking the received customer usage information to at least one application provisioned on the device;
    receiving cloud service usage information for the devices from a cloud operator providing cloud services;
    comparing the linked customer usage information from one or more network elements and the received cloud service usage information from the cloud operator providing cloud services for one or more discrepancies in relation to the one or more billable activities by a reconciliation engine; and
    reporting one or more identified discrepancies in accordance with the one or more billable activities.

22. The computer implemented method of claim 21, further comprising: receiving application usage information regarding the one or more billable activities for one or more devices from an application provider core by a billing and analytic system; and
    comparing the received application usage information, the linked customer usage information from one or more network elements, and the received cloud service usage information for one or more discrepancies in relation to one or more billable activities by a reconciliation engine.

* * * * *